(12) United States Patent
Kalyankar et al.

(10) Patent No.: US 12,487,378 B2
(45) Date of Patent: Dec. 2, 2025

(54) LENS COATINGS

(71) Applicant: Apple Inc., Cupertino, CA (US)

(72) Inventors: Nikhil D Kalyankar, Fremont, CA (US); Avery P Yuen, Campbell, CA (US); Ove Lyngnes, Carmel Valley, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/456,967

(22) Filed: Aug. 28, 2023

(65) Prior Publication Data

US 2024/0402394 A1    Dec. 5, 2024

Related U.S. Application Data

(60) Provisional application No. 63/505,992, filed on Jun. 2, 2023.

(51) Int. Cl.
*G02B 1/115*    (2015.01)
*G02B 1/118*    (2015.01)
*G02B 27/00*    (2006.01)
*G06F 1/16*     (2006.01)

(52) U.S. Cl.
CPC .............. *G02B 1/115* (2013.01); *G02B 1/118* (2013.01); *G02B 27/0093* (2013.01); *G06F 1/163* (2013.01)

(58) Field of Classification Search
CPC .... G02B 1/118; G02B 1/115; G02B 27/0093; G06F 1/163
See application file for complete search history.

(56) References Cited

U.S. PATENT DOCUMENTS

| | | | |
|---|---|---|---|
| 5,619,373 | A | 4/1997 | Meyerhofer et al. |
| 9,870,049 | B2 | 1/2018 | Raffle et al. |
| 10,642,048 | B2 | 5/2020 | Peng et al. |
| 11,002,898 | B2 | 5/2021 | Peng et al. |
| 11,340,702 | B2 | 5/2022 | Sharma et al. |

(Continued)

FOREIGN PATENT DOCUMENTS

| | | |
|---|---|---|
| CN | 212846201 U | 3/2021 |
| JP | 2018005139 A * | 1/2018 |

(Continued)

*Primary Examiner* — Zhubing Ren
(74) *Attorney, Agent, or Firm* — Treyz Law Group, P.C.; David K. Cole (57) ABSTRACT

A head-mounted device may have left-eye and right-eye optical modules that may have a display that creates an image and a corresponding lens that provides the image to an eye box for viewing by a user. The optical modules each include a lens barrel to which the display and lens of that optical module are mounted and a head-mounted optical module gaze tracking system. The gaze tracking system may have light-emitting devices such as light-emitting diodes that emit light at a given near infrared wavelength and may operate through the lens and a removable supplemental lens. The supplemental lens may be a prescription lens and may have an antireflection portion that reduces the reflectance of the lens across visible and near infrared wavelengths. The antireflection portion may be a thin-film interference coating or a moth-eye portion. In this way, the gaze tracking system may operate through the removable supplemental lens.

13 Claims, 8 Drawing Sheets

(56) References Cited

U.S. PATENT DOCUMENTS

| | | |
|---|---|---|
| 11,550,153 B2 | 1/2023 | Gao et al. |
| 11,668,930 B1 | 6/2023 | Pennell et al. |
| 2003/0103271 A1* | 6/2003 | Ohta ........................ G02B 3/02 359/719 |
| 2012/0106191 A1* | 5/2012 | Duong ...................... F21K 9/62 362/555 |
| 2018/0067337 A1* | 3/2018 | Brown .................... G02B 1/111 |
| 2018/0100952 A1* | 4/2018 | Borgharkar ............ G02B 5/283 |
| 2018/0201541 A1* | 7/2018 | March .................... B82Y 30/00 |
| 2020/0379561 A1* | 12/2020 | Sharma ................ G06T 19/006 |

FOREIGN PATENT DOCUMENTS

| | | | |
|---|---|---|---|
| WO | WO-2022098574 A1 * | 5/2022 | ........... G02B 26/004 |
| WO | 2022119679 A1 | 6/2022 | |
| WO | 2023048984 A1 | 3/2023 | |

\* cited by examiner

LENS COATINGS

This application claims the benefit of U.S. provisional patent application No. 63/505,992, filed Jun. 2, 2023, which is hereby incorporated by reference herein in its entirety.

FIELD

This relates generally to electronic devices, and, more particularly, to wearable electronic devices such as head-mounted devices.

BACKGROUND

Electronic devices such as head-mounted devices may have displays for displaying images. The displays may be housed in optical modules. A user may view the displayed images while a head-mounted device is being worn on the user's head.

SUMMARY

A head-mounted device may have left-eye and right-eye optical modules that move with respect to each other. Each optical module may have a display that creates an image and a corresponding lens that provides the image to an associated eye box for viewing by a user. The optical modules may each include a lens barrel in which the display and lens of that optical module are mounted. The optical modules may also each include a head-mounted device optical module gaze tracking system.

The gaze tracking system in each optical module may be used to create glints on a user's eye. One or more cameras in the optical module may monitor the glints to track the gaze of the user. The cameras may also measure the shape of a user's pupil while the eye box in which the pupil is located is illuminated by the gaze tracking system. In some configurations, illumination may be provided from the gaze tracking system while a camera captures biometric identification information such as iris information.

The gaze tracking system of each optical module may have light sources operating at visible wavelengths, infrared wavelengths, and/or other wavelengths. The light sources may be, for example, near infrared light-emitting diodes.

Each optical module may also include a removable supplemental lens, such as a lens with a prescription based on the user's eyesight. The removable supplemental lens may be clipped onto the lens barrel, magnetically coupled to the lens barrel, or otherwise removably attached to the lens barrel.

The removable supplemental lens may include an antireflection portion to reduce the reflectance of the removable supplemental lens across visible and near infrared wavelengths. The antireflection portion may be a thin-film interference coating formed from thin film layers with alternating high and low refractive indexes, a moth-eye coating, or an integral moth-eye portion.

In this way, the gaze tracking system may operate through the removable supplemental lens at a near infrared wavelength, and the user may see through the removable supplemental lens.

DETAILED DESCRIPTION

An electronic device such as a head-mounted device may have a front face that faces away from a user's head and may have an opposing rear face that faces the user's head. Optical modules on the rear face may be used to provide images to a user's eyes. To monitor the eyes of a user, the electronic device may be provided with eye monitoring components. These components may include, for example, cameras. An illumination system in each optical module may be used to provide light. The light may illuminate the user's eyes so that the cameras can capture images of the user's eyes. In an illustrative configuration, the illumination system of each optical module includes multiple discrete light sources such as light-emitting diodes. The light-emitting diodes may create glints on the user's eyes and can illuminate the user's pupils and irises. The cameras can then monitor the positions of the glints and/or the shapes of the user's pupils to determine the direction of gaze of the user. The cameras can also capture images of the user's irises (e.g., for biometric authentication).

In some embodiments, the head-mounted device may include one or more lenses that provide the images to the user's eyes. Additionally, it may be desirable to include one or more supplemental lenses that can be added to the device. For example, the supplemental lenses may be prescription lenses that can be clipped on, magnetically attached, or otherwise coupled to the head-mounted device. These prescription lenses may be tailored to the user's prescription, for example.

The gaze tracking illumination (and glint reflection) may operate through the supplemental lenses. Therefore, one or more antireflection portions may be applied to the supplemental lenses to allow the gaze tracking illumination and glint reflections to pass through the supplemental lenses. For example, if the gaze tracking illumination is near infrared (NIR) light at 940 nm or 850 nm wavelengths, as examples, then the antireflection portions may allow for high transmission and low reflectance through the supplemental lenses at those wavelengths, while maintaining high transmission across visible wavelengths (e.g., 425 nm to 800 nm). As illustrative examples, a thin-film interference filter antireflection coating or a moth-eye antireflection coating may be applied to the lenses to provide for high transmission at both NIR and visible wavelengths. Alternatively, the lenses themselves may be embossed/textured to provide a moth-eye antireflection portion. In this way, the lenses may have suitable transmission at both visible and near infrared wavelengths.

Figure 1:
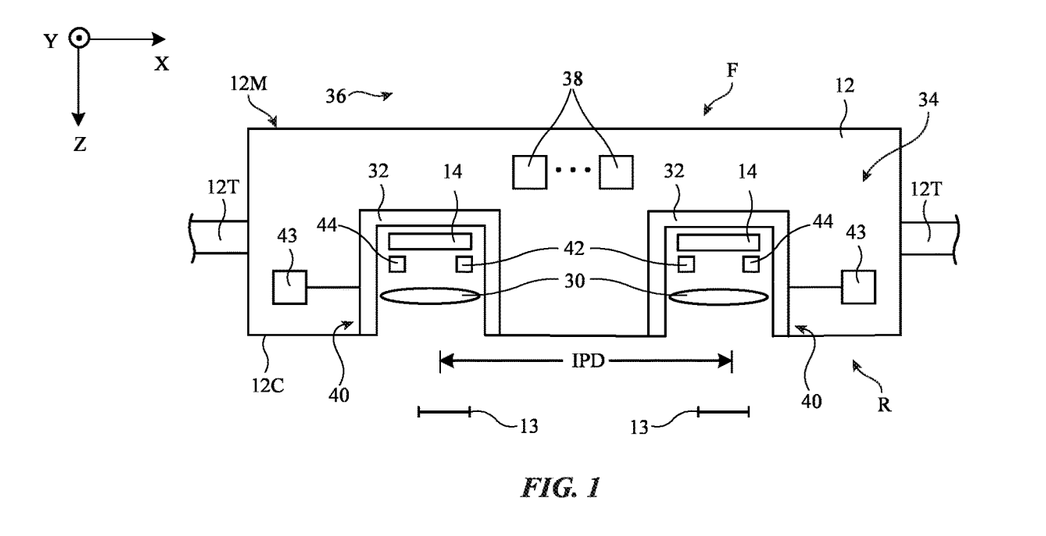
FIG. 1 is a top view of an illustrative head-mounted device in accordance with some embodiments.

A top view of an illustrative head-mounted device is shown in FIG. 1. As shown in FIG. 1, head-mounted devices such as electronic device 10 may have head-mounted support structures such as housing 12. Housing 12 may include portions (e.g., support structures 12T) to allow device 10 to be worn on a user's head. Support structures 12T may be formed from fabric, polymer, metal, and/or other material. Support structures 12T may form a strap or other head-mounted support structures to help support device 10 on a user's head. A main support structure (e.g., main housing portion 12M) of housing 12 may support electronic components such as displays 14. Main housing portion 12M may include housing structures formed from metal, polymer, glass, ceramic, and/or other material. For example, housing portion 12M may have housing walls on front face F and housing walls on adjacent top, bottom, left, and right side faces that are formed from rigid polymer or other rigid support structures and these rigid walls may optionally be covered with electrical components, fabric, leather, or other soft materials, etc. The walls of housing portion 12M may enclose internal components 38 in interior region 34 of device 10 and may separate interior region 34 from the environment surrounding device 10 (exterior region 36). Internal components 38 may include integrated circuits, actuators, batteries, sensors, and/or other circuits and structures for device 10. Housing 12 may be configured to be worn on a head of a user and may form glasses, a hat, a helmet, goggles, and/or another head-mounted device. Configurations in which housing 12 forms goggles may sometimes be described herein as an example.

Front face F of housing 12 may face outwardly away from a user's head and face. Opposing rear face R of housing 12 may face the user. Portions of housing 12 (e.g., portions of main housing 12M) on rear face R may form a cover such as cover 12C (sometimes referred to as a curtain). The presence of cover 12C on rear face R may help hide internal housing structures, internal components 38, and other structures in interior region 34 from view by a user.

Device 10 may have left and right optical modules 40. Each optical module may include a respective display 14, lens 30, and support structure 32. Support structures 32, which may sometimes be referred to as lens barrels or optical module support structures, may include hollow cylindrical structures with open ends or other supporting structures to house displays 14 and lenses 30. Support structures 32 may, for example, include a left lens barrel that supports a left display 14 and left lens 30 and a right lens barrel that supports a right display 14 and right lens 30.

Displays 14 may include arrays of pixels or other display devices to produce images. Displays 14 may, for example, include organic light-emitting diode pixels formed on substrates with thin-film circuitry and/or formed on semiconductor substrates, pixels formed from crystalline semiconductor dies, liquid crystal display pixels, scanning display devices, and/or other display devices for producing images.

Lenses 30 may include one or more lens elements for providing image light from displays 14 to respective eyes boxes 13. Lenses may be implemented using refractive glass lens elements, using mirror lens structures (catadioptric lenses), using Fresnel lenses, using holographic lenses, and/or other lens systems.

When a user's eyes are located in eye boxes 13, displays (display panels) 14 operate together to form a display for device 10 (e.g., the images provided by respective left and right optical modules 40 may be viewed by the user's eyes in eye boxes 13 so that a stereoscopic image is created for the user). The left image from the left optical module fuses with the right image from a right optical module while the display is viewed by the user. The images provided to eye boxes 13 may provide the user with a virtual reality environment, an augmented reality environment, and/or a mixed reality environment (e.g., different environments may be used to display different content to the user at different times).

It may be desirable to monitor the user's eyes while the user's eyes are located in eye boxes 13. For example, it may be desirable to use a camera to capture images of the user's irises (or other portions of the user's eyes) for user authentication. It may also be desirable to monitor the direction of the user's gaze. Gaze tracking information may be used as a form of user input and/or may be used to determine where, within an image, image content resolution should be locally enhanced in a foveated imaging system. To ensure that device 10 can capture satisfactory eye images while a user's eyes are located in eye boxes 13, each optical module 40 may be provided with a camera such as camera 42 and one or more light sources such as light-emitting diodes 44 (e.g., lasers, lamps, etc.). Multiple cameras 42 may be provided in each optical module 40, if desired.

Cameras 42 and light-emitting diodes 44 may operate at any suitable wavelengths (visible, infrared, and/or ultraviolet). With an illustrative configuration, which may sometimes be described herein as an example, diodes 44 emit infrared light or near infrared light that is invisible (or nearly invisible) to the user, such as near infrared light at 950 nm or 840 nm. This allows eye monitoring operations to be performed continuously without interfering with the user's ability to view images on displays 14.

Not all users have the same interpupillary distance IPD. To provide device 10 with the ability to adjust the interpupillary spacing between modules 40 along lateral dimension X and thereby adjust the spacing IPD between eye boxes 13 to accommodate different user interpupillary distances, device 10 may be provided with actuators 43. Actuators 43 can be manually controlled and/or computer-controlled actuators (e.g., computer-controlled motors) for moving support structures 32 relative to each other. Information on the locations of the user's eyes may be gathered using, for example, cameras 42. The locations of eye boxes 13 can then be adjusted accordingly.

Figure 2:
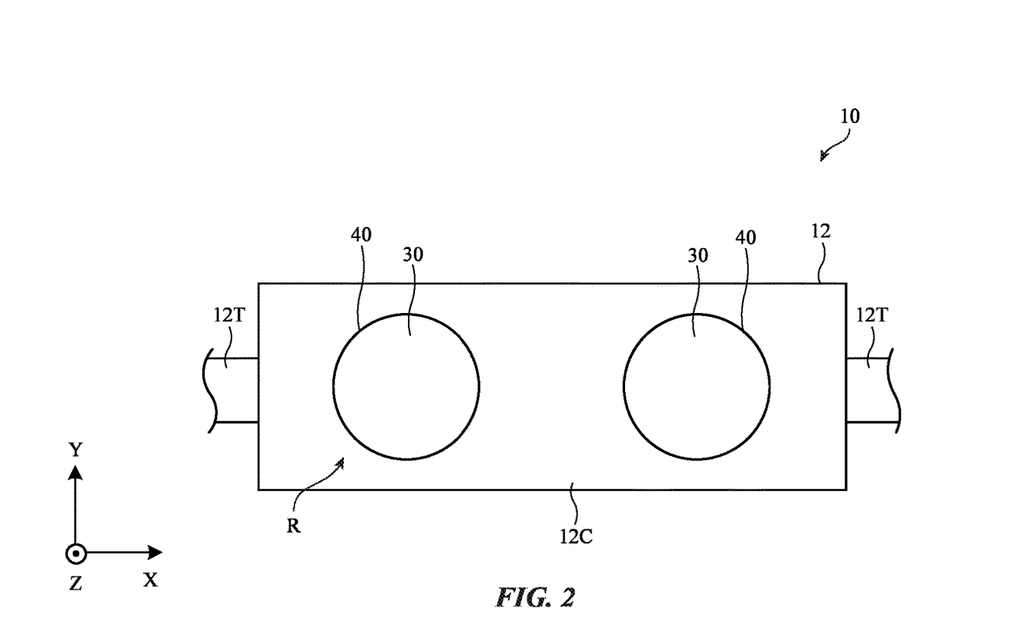
FIG. 2 is a rear view of an illustrative head-mounted device in accordance with some embodiments.

As shown in FIG. 2, cover 12C may cover rear face F while leaving lenses 30 of optical modules 40 uncovered (e.g., cover 12C may have openings that are aligned with and receive modules 40). As modules 40 are moved relative to each other along dimension X to accommodate different interpupillary distances for different users, modules 40 move relative to fixed housing structures such as the walls of main portion 12M and move relative to each other.

Figure 3:
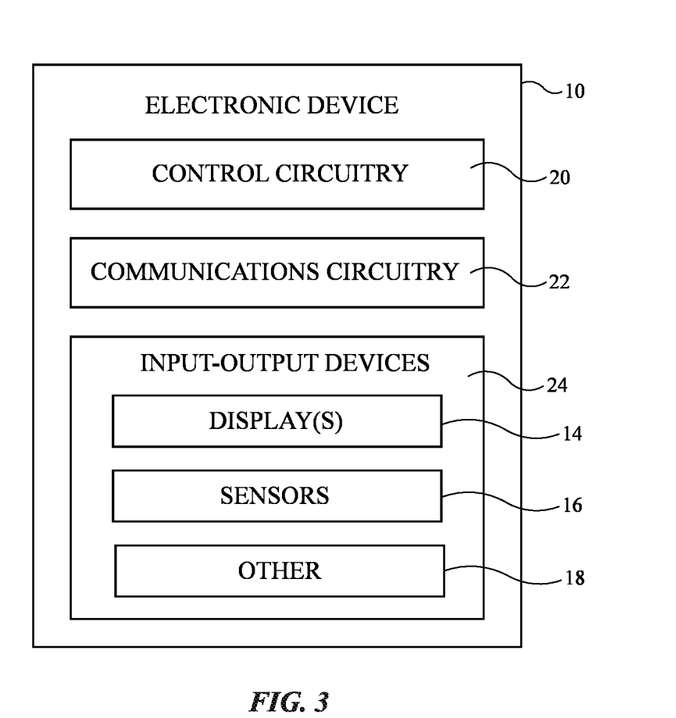
FIG. 3 is a schematic diagram of an illustrative head-mounted device in accordance with some embodiments.

A schematic diagram of an illustrative electronic device such as a head-mounted device or other wearable device is shown in FIG. 3. Device 10 of FIG. 3 may be operated as a stand-alone device and/or the resources of device 10 may be used to communicate with external electronic equipment. As an example, communications circuitry in device 10 may be used to transmit user input information, sensor information, and/or other information to external electronic devices (e.g., wirelessly or via wired connections). Each of these external devices may include components of the type shown by device 10 of FIG. 3.

As shown in FIG. 3, a head-mounted device such as device 10 may include control circuitry 20. Control circuitry 20 may include storage and processing circuitry for supporting the operation of device 10. The storage and processing circuitry may include storage such as nonvolatile memory (e.g., flash memory or other electrically-programmable-read-only memory configured to form a solid-state drive), volatile memory (e.g., static or dynamic random-access-memory), etc. Processing circuitry in control circuitry 20 may be used to gather input from sensors and other input devices and may be used to control output devices. The processing circuitry may be based on one or more microprocessors, microcontrollers, digital signal processors, baseband processors and other wireless communications circuits, power management units, audio chips, application specific integrated circuits, etc. During operation, control circuitry 20 may use display(s) 14 and other output devices in providing a user with visual output and other output.

To support communications between device 10 and external equipment, control circuitry 20 may communicate using communications circuitry 22. Circuitry 22 may include antennas, radio-frequency transceiver circuitry, and other wireless communications circuitry and/or wired communications circuitry. Circuitry 22, which may sometimes be referred to as control circuitry and/or control and communications circuitry, may support bidirectional wireless communications between device 10 and external equipment (e.g., a companion device such as a computer, cellular telephone, or other electronic device, an accessory such as a point device, computer stylus, or other input device, speakers or other output devices, etc.) over a wireless link. For example, circuitry 22 may include radio-frequency transceiver circuitry such as wireless local area network transceiver circuitry configured to support communications over a wireless local area network link, near-field communications transceiver circuitry configured to support communications over a near-field communications link, cellular telephone transceiver circuitry configured to support communications over a cellular telephone link, or transceiver circuitry configured to support communications over any other suitable wired or wireless communications link. Wireless communications may, for example, be supported over a Bluetooth® link, a WiFi® link, a wireless link operating at a frequency between 10 GHz and 400 GHz, a 60 GHz link, or other millimeter wave link, a cellular telephone link, or other wireless communications link. Device 10 may, if desired, include power circuits for transmitting and/or receiving wired and/or wireless power and may include batteries or other energy storage devices. For example, device 10 may include a coil and rectifier to receive wireless power that is provided to circuitry in device 10.

Device 10 may include input-output devices such as devices 24. Input-output devices 24 may be used in gathering user input, in gathering information on the environment surrounding the user, and/or in providing a user with output. Devices 24 may include one or more displays such as display(s) 14. Display(s) 14 may include one or more display devices such as organic light-emitting diode display panels (panels with organic light-emitting diode pixels formed on polymer substrates or silicon substrates that contain pixel control circuitry), liquid crystal display panels, microelectromechanical systems displays (e.g., two-dimensional mirror arrays or scanning mirror display devices), display panels having pixel arrays formed from crystalline semiconductor light-emitting diode dies (sometimes referred to as microLEDs), and/or other display devices.

Sensors 16 in input-output devices 24 may include force sensors (e.g., strain gauges, capacitive force sensors, resistive force sensors, etc.), audio sensors such as microphones, touch and/or proximity sensors such as capacitive sensors such as a touch sensor that forms a button, trackpad, or other input device), and other sensors. If desired, sensors 16 may include optical sensors such as optical sensors that emit and detect light, ultrasonic sensors, optical touch sensors, optical proximity sensors, and/or other touch sensors and/or proximity sensors, monochromatic and color ambient light sensors, image sensors, fingerprint sensors, iris scanning sensors, retinal scanning sensors, and other biometric sensors, temperature sensors, sensors for measuring three-dimensional non-contact gestures ("air gestures"), pressure sensors, sensors for detecting position, orientation, and/or motion (e.g., accelerometers, magnetic sensors such as compass sensors, gyroscopes, and/or inertial measurement units that contain some or all of these sensors), health sensors such as blood oxygen sensors, heart rate sensors, blood flow sensors, and/or other health sensors, radio-frequency sensors, depth sensors (e.g., structured light sensors and/or depth sensors based on stereo imaging devices that capture three-dimensional images), optical sensors such as self-mixing sensors and light detection and ranging (lidar) sensors that gather time-of-flight measurements, humidity sensors, moisture sensors, gaze tracking sensors, electromyography sensors to sense muscle activation, facial sensors, and/or other sensors. In some arrangements, device 10 may use sensors 16 and/or other input-output devices to gather user input. For example, buttons may be used to gather button press input, touch sensors overlapping displays can be used for gathering user touch screen input, touch pads may be used in gathering touch input, microphones may be used for gathering audio input, accelerometers may be used in monitoring when a finger contacts an input surface and may therefore be used to gather finger press input, etc.

If desired, electronic device 10 may include additional components (see, e.g., other devices 18 in input-output devices 24). The additional components may include haptic output devices, actuators for moving movable housing structures, audio output devices such as speakers, light-emitting diodes for status indicators, light sources such as light-emitting diodes that illuminate portions of a housing and/or display structure, other optical output devices, and/or other circuitry for gathering input and/or providing output. Device 10 may also include a battery or other energy storage device, connector ports for supporting wired communication with ancillary equipment and for receiving wired power, and other circuitry.

Figure 4:
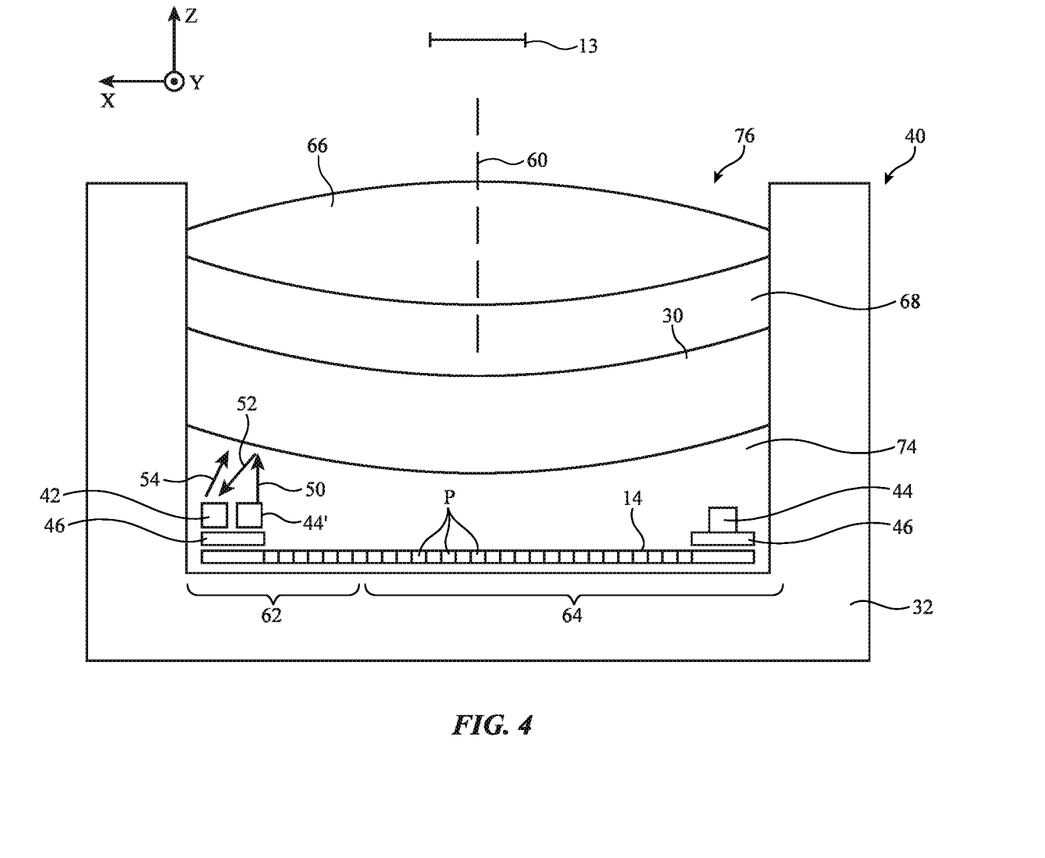
FIG. 4 is a cross-sectional side view of an illustrative optical module with an eye illumination system operating through a removable supplemental lens in accordance with some embodiments.

A cross-sectional side view of an illustrative optical module for device 10 is shown in FIG. 4. As shown in FIG. 4, optical module 40 may have lens barrel 32. Lens 30 may be used to provide an image from pixels P of display 14 to eye box 13 along optical axis 60. To provide eye illumination that illuminates an eye that is located in eye box 13, module 40 may contain one or more light sources (e.g., lasers, light-emitting diodes, lamps, etc.) such as light-emitting diodes 44. One or more cameras 42 may be included in each optical module 40 to monitor eye box 13. As shown in FIG. 4, for example, camera 42 may operate in direction 54 and may capture images of the user's eye while the user's eye is located in eye box 13.

Light-emitting diodes 44 may emit light at one or more wavelengths of interest (e.g., visible light wavelengths and/or infrared light wavelengths, etc.) and camera 42 may be sensitive at these wavelengths (e.g., visible light wavelengths and/or infrared light wavelengths, etc.). In an illustrative configuration, light-emitting diodes 44 emit infrared light or near infrared light. Infrared light or near infrared light may be used to illuminate the user's eye in eye box 13 while being unnoticeable (or nearly unnoticeable) to the user (e.g., because human vision is not generally sensitive to infrared light except when the infrared light has an infrared wavelength near the edge of the visible light spectrum, which extends from 380 to 740 nm).

Electronic components in module 40 such as display 14, camera 42, and light-emitting diodes 44 may be coupled to flexible printed circuits or other substrates containing metal traces. The metal traces may form interconnect paths that carry power signals, data signals, and control signals. As shown in FIG. 4, for example, light-emitting diodes 44 may be mounted on a ring-shaped substrate such as flexible printed circuit 46. Printed circuit 46 and light-emitting diodes 44 may extend around some or all of the inner periphery of lens barrel 32 (and therefore around some or all of the outer periphery of display 14).

During operation, light from light-emitting diodes 44 that are mounted along the edge of display 14 may travel to eye box 13 through lens 30. Light-emitting diodes 44 are generally out of the user's field of view or nearly out of the user's field of view as the user is viewing images presented by the array of pixels P on display 14. Some of light-emitting diodes 44 (e.g., N light-emitting diodes 44, where N is at least 3, at least 4, at least 5, at least 6, 3-9, less than 15, less than 10, less than 7, less than 6, or other suitable number) may create reflections off of the surface of the user's eye in eye box 13. These reflections, which may sometimes be referred to as glints, can be captured by camera 42. Device 10 can process glint information obtained by cameras 24 to track the user's gaze. For example, control circuitry 20 can analyze the positions of the glints to determine the shape of the user's eye (e.g., the user's cornea). From this information, control circuitry 20 can determine the direction of the user's gaze.

In addition to serving as glint light sources (e.g., light sources that produce glint illumination that is detected as discrete eye glints by camera 42), light from light-emitting diodes 44 may serve as blanket eye illumination. In particular, light from light-emitting diodes 44 may illuminate portions of each of the user's eyes such as the user's iris and the user's pupil.

During operation, camera 42 can capture an image of the user's pupil as the pupil is being illuminated by light from diodes 44. The user's pupil will have a shape (e.g., an oval shape) that varies depending on the orientation of the user's eye to camera 42. If, as an example, the eye is aligned with camera 42, the pupil will appear circular or nearly circular, whereas if the eye is angled away from camera 42, the pupil will have higher eccentricity. By analyzing the shape of the pupil, control circuitry 20 can determine the direction of the user's gaze.

It may also be desirable for camera 42 to capture other eye images such as images of the iris of the user's eye. Iris patterns are user-specific, so iris images may be used to authenticate users in device 10 (e.g., to log the user into a user account, to substitute for a username and/or password, or to otherwise serve as a biometric credential for device 10).

Pupil illumination and the illumination for the glints can be produced by light-emitting diodes 44 at the same wavelength or at different wavelengths. For example, pupil and glint illumination can be provided by light-emitting diodes 44 at a wavelength of 940 nm, 850 nm, 800-1000 nm, at least 800 nm, at least 850 nm, at least 900 nm, at least 950 nm, less than 950 nm, or other suitable wavelength. Configurations in which the wavelength of the glint and pupil illumination is sufficiently long to be invisible to most or all users may help allow glint and pupil measurements and/or other gaze tracking measurements to be taken continuously during operation of device 10, without potentially distracting users. Iris illumination may be provided by light-emitting diodes 44 at the same wavelength and/or a different wavelength than the glint illumination and the pupil illumination. To obtain desired image contrast when gathering iris information, it may be desirable for iris illumination to be provided at a shorter wavelength than the pupil and glint illumination (e.g., at a visible light wavelength and/or at a shorter infrared wavelength than used by diodes 44 when providing gaze tracking illumination). Camera 42 may include a single image sensor that captures pupil image data, glint image data, and iris image data, and/or multiple cameras may be provided each of which captures image data at a different wavelength (or band of wavelengths).

Consider, as an example, a scenario in which camera 42 is sensitive to infrared light over a range of wavelengths (e.g., one or more wavelengths between 780 nm and 1000 nm or other suitable wavelength range). Light-emitting diodes 44 may emit light at multiple wavelengths. For example, light-emitting diodes 44 may contain a first set of light-emitting diodes that produce illumination at a first wavelength (e.g., 850 nm, a wavelength between 780 and 870 nm, a wavelength of less than 900 nm, etc.) and may contain a separate second set of light-emitting diodes that produce illumination at a second wavelength (e.g., a second wavelength that is greater than the first wavelength such as a wavelength of 940 nm, at least 900 nm, 890-1000 nm, etc.). In this type of arrangement, the first set of light-emitting diodes may be used when device 10 is initially started up (e.g., to help camera 42 capture high-contrast iris images or other eye images for authentication), whereas the second set of light-emitting diodes may be operate later, during normal operation, to track the user's gaze. To avoid the possibility of the iris illumination being noticed by a user (e.g., a user who happens to be sensitive to near infrared light just past the edge of the visible light spectrum), the first set of light-emitting diodes may be turned off during normal operation. If desired, iris illumination may be provided in the visible light spectrum in addition to or instead of using infrared iris illumination.

It is possible that light from light-emitting diodes 44 can exhibit undesired reflections from the surface of lens 30 facing display 14. For example, if a light-emitting diode is located adjacent to camera 42, there is a possibility that an emitted light ray will follow path 50 to lens 30 and, upon directly reflecting from the surface of lens 30, will follow path 52 to camera 42. This direct reflection of the output of the light-emitting diode from the inner surface of lens 30 to camera 42 may be too strong and may overwhelm camera 42 and/or may otherwise interfere with the ability of camera 42 to capture a clear image of the glints on the user's eye and/or the user's pupil shape. To prevent this possibility, it may be desirable to mount light-emitting diodes 44 on flexible printed circuit 46 only in areas of barrel 32 such as region 64 that are located away from camera 42 and not in areas of barrel 32 such as region 62 that are adjacent to camera 42

(e.g., within 5 mm of camera 42, within 1 cm of camera 42, within 2 cm of camera 42, or within other suitable close distance to camera 42 that creates direct lens reflections detected by camera 42).

In addition to lens 30, supplemental lens 66 may be coupled to lens barrel 32. Supplemental lens 66 may be a removable lens that may be clipped on, magnetically attached, or otherwise removably coupled to lens barrel 32. In the illustrative example of FIG. 4, supplemental lens 66 may be removably coupled to lens barrel 32 within lens barrel 32. However, this is merely illustrative. In general, supplemental lens 66 may be coupled to any suitable portion of lens barrel 32, such as the upper surfaces of lens barrel 32 (e.g., the surfaces in the greatest +Z direction of FIG. 4).

In some embodiments, supplemental lens 66 may be a lens having a prescription that matches the prescription of a user of device 10. In this way, the user of device 10 may see images produced by display 14 in focus. However, this is merely illustrative. In some embodiments, supplemental lens 66 may be a removable lens with zero power correction (e.g., no prescription) to shield components within lens barrel 32.

A shown in FIG. 4, light-emitting diodes 44 may operate through supplemental lens 66 when supplemental lens 66 is attached to lens barrel 32. In particular, light emitted by light-emitting diodes 44 may pass through supplemental lens 66 (and lens 30) to eye box 13, and camera 42 may image glints on the user's eye through supplemental lens 66 (and lens 30). Although some reflections off of supplemental lens 66 may be mitigated through the placement of camera 42 and light-emitting diodes 44, prescription lenses generally have high reflectance in near infrared wavelengths, while having low reflectance in visible wavelengths. Therefore, an antireflection portion, such as an antireflection coating, that reduces the lens's reflectance in near infrared wavelengths may be applied to supplemental lens 66. In this way, a gaze tracking system, such as the system including light-emitting diodes 44 and camera 42, may operate through supplemental lens 66. An illustrative example of a lens having an antireflection coating is shown in FIG. 5.

Figure 5:
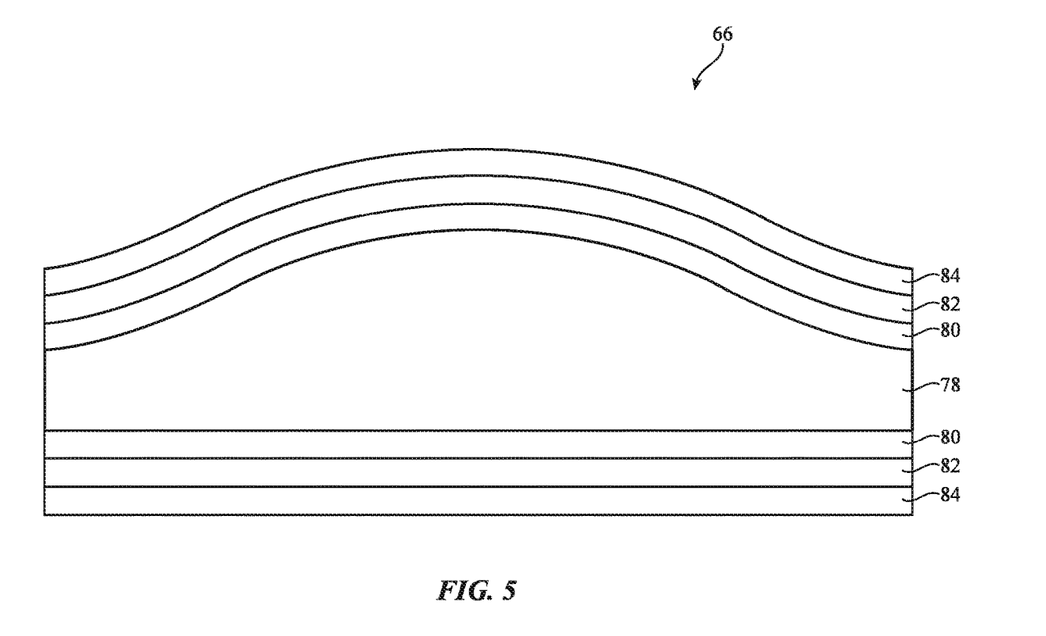
FIG. 5 is a side view illustrative supplemental lens with a substrate, hard coat, antireflection coating, and environmental coating in accordance with some embodiments.

As shown in FIG. 5, supplemental lens 66 may include substrate 78 (also referred to as a lens element herein). Substrate 78 may be formed from polycarbonate, glass, sapphire, or other suitable transparent material. Hard coats 80 may be formed on opposing surfaces of substrate 78. Hard coats 80 may be formed from a polysiloxane material, a polyethylene material, a hybrid material (e.g., epoxy), or other suitable material. In some embodiments, a primer, such as polyurethane, may be incorporated on the surface of substrate 78 between substrate 78 and hard coats 80 to promote adhesion of hard coats 80 to substrate 78. However, the arrangement of FIG. 5 is merely illustrative. In some embodiments, hard coats 80 may be omitted on one or both surfaces of substrate 78.

Antireflection coatings 82 may be formed on hard coats 80 (or directly on substrate 78 if hard coats 80 are omitted). Antireflection coatings 82 may reduce the reflectance of supplemental lens 66. In particular, because the gaze tracking system of FIG. 4 operates through supplemental lens 66, and the user of the head-mounted device needs to see through supplemental lens 66 (e.g., to view the images produced by display 14), supplemental lens 66 needs low reflectance in the wavelength used by the gaze tracking system and across visible wavelengths. For example, if the gaze tracking system operates at near infrared wavelengths (such as 850 nm and/or 940 nm), supplemental lens 66 will require low reflectance (e.g., high transmission) at those infrared wavelengths, while also having low reflectance at visible wavelengths. In this way, supplemental lens 66 may have low reflectance and allow a gaze tracking system to operate through the lens.

Environmental layers 84 may be formed on antireflection coatings 82. Environmental layers 84 may be antifog layers (e.g., anti-phyllic layers that reject moisture, such as humidity), or may be antismudge layers (e.g., fluoropolymer layers that reject fingerprints and other smudges). Therefore, environmental layers 84 may prevent environmental factors, such as humidity or fingerprints, from interfering with a user's view through supplemental lens 66.

Although FIG. 5 shows hard coats 80, antireflection coatings 82, and environmental coatings 84 on both sides of lens element 78, this is merely illustrative. In general, one or more of hard coats 80, antireflection coatings 82, or environmental coatings 84 may be omitted from supplemental lens 66 on one or both sides of supplemental lens 66.

In general, antireflection coating(s) 82 may reduce reflectance of supplemental lens 66 across both visible and near infrared wavelengths. An illustrative example of a reflectance profile across visible and near infrared wavelengths for a supplemental lens with one or more antireflection coatings (or other antireflection portions) is shown in FIG. 6.

Figure 6:
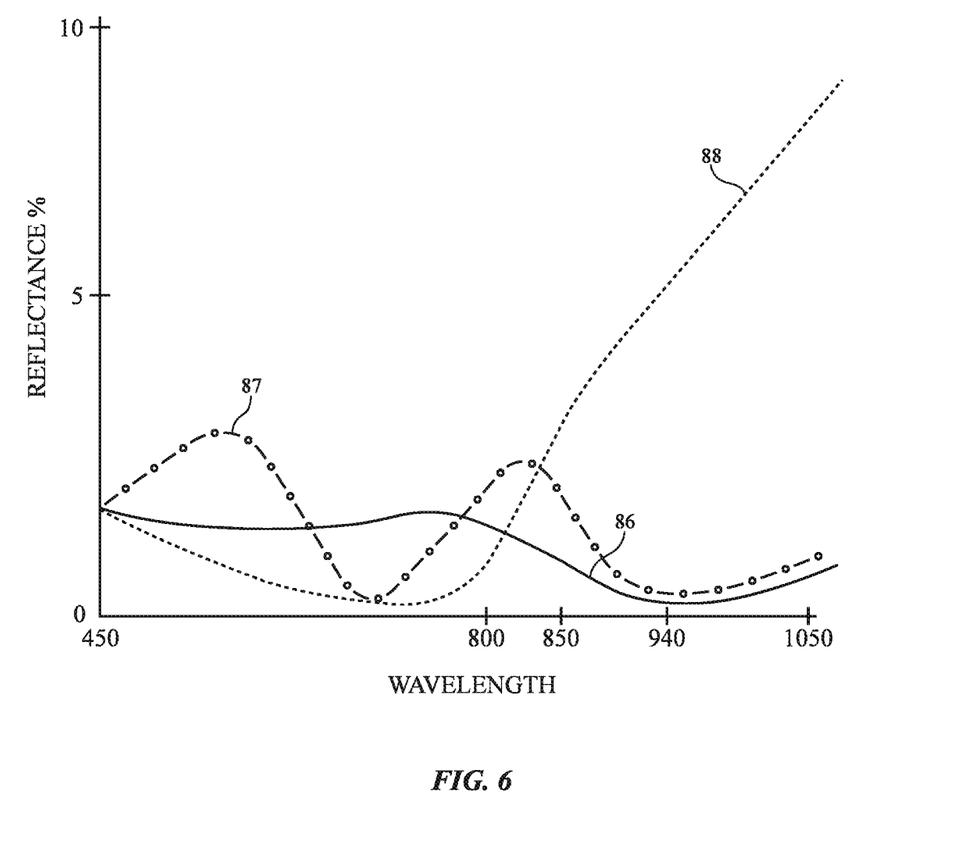
FIG. 6 is a diagram of illustrative reflectance profiles for a supplemental lens with an antireflection portion in accordance with some embodiments.

As shown in FIG. 6, a supplemental lens having an antireflection coating or other antireflection portion, such as supplemental lens 66 of FIG. 5, may have reflectance profile 86 or 87 at on-axis viewing angles (e.g., 0° from a surface normal of the lens/coating). As shown by reflectance profiles 86 and 87, the supplemental lens may have a reflectance of less than 3%, of less than 2%, of less than 2.5%, or other suitable reflectance across visible wavelengths (e.g., between 425 nm and 800 nm, between 450 nm and 700 nm, or other range of visible wavelengths). Moreover, the supplemental lens may have a reflectance of less than 2% or less than 1.5% across near infrared wavelengths (e.g., between 800 nm to 1000 nm). In particular, the supplemental lens may have a minimum reflectance (such as less than 1%) at 940 nm, which may correspond to the near infrared wavelength used by a gaze tracking system. However, this is merely illustrative. The supplemental lens may have a minimum reflectance (e.g., less than 1%) at 850 nm or any other suitable wavelength that is used by a gaze tracking system.

Supplemental lens 66 may therefore have low reflectance (e.g., less than 3.5% or less than 2.5%) at both visible and near infrared wavelengths, such as an average reflectance of less than 2.5% across both visible and near infrared wavelengths. This is in contrast to typical ophthalmic lenses, which may have a much larger reflectance in near infrared (and a slightly lower reflectance in visible wavelengths), as shown by reflectance profile 88. Because there is a tradeoff between reflectance in visible wavelengths and reflectance in near infrared wavelengths, supplemental lens 66 may have a slightly higher reflectance than a typical ophthalmic lens at visible wavelengths, while remaining highly transmissive at visible wavelengths and gaining transmissivity at near infrared wavelengths. In this way, supplemental lens 66 may allow a user to see through the lens clearly, while also allowing a gaze tracking system to operate through the lens.

Supplemental lens 66 may have a low reflectance at off-axis viewing angles, as well. For example, supplemental lens 66 may have a reflectance of less than 3.5%, of 3.3% or less, of less than 4%, or other suitable reflectance across both visible and near infrared wavelengths at viewing angles between 0° and 45° from a surface normal of the lens/coating. Supplemental lens 66 may have a reflection of less than 8%, of 7.5% or less, of between 6% and 8%, or other suitable reflectance across near infrared wavelengths at viewing angles between 0° and 60° from the surface normal. Supplemental lens 66 may have a reflection of less than 30%, of 27% or less, or other suitable reflectance across near infrared wavelengths at viewing angles of 75° from the surface normal. In this way, supplemental lens 66 may have low reflectance in both visible and near infrared wavelengths at on-axis and off-axis viewing angles.

Supplemental lens 66 may have low reflectance across visible and near infrared wavelengths on-axis and off-axis at both low and high-power prescriptions. For example, supplemental lens 66 may have a prescription of −12.5DS or less, −10DS or less, −8DS or less, ODS, +6DS or less, or +6.5DS or less, as examples, and still have low reflectance across visible and infrared wavelengths.

In addition to having low reflectance, supplemental lens 66 may have a haze of less than 0.5%, of 0.3%, of between 0.1% and 0.5%, or other suitable haze, allowing images that pass through supplemental lens 66 (e.g., from display 14 of FIG. 4) clearly. Additionally, supplemental lens 66 may transmit at least 95% of light between visible wavelengths of 425 nm and 700 nm. Therefore, supplemental lens 66 may have low visible light and near infrared light reflectance, low haze, and high visible light transmission.

In general, an antireflection coating (e.g., antireflection coating 82 of FIG. 5) or other antireflection portion of a supplemental lens may have any suitable structure. As examples, antireflection coating 82 may be formed from thin-film layers with alternating high and low refractive indexes to constructively interfere with light at visible and near infrared wavelengths, or antireflection coating 82 may be formed from a moth-eye antireflection coating. An illustrative example of a lens having an antireflection coating formed from a thin-film interference filter is shown in FIG. 7.

Figure 7:
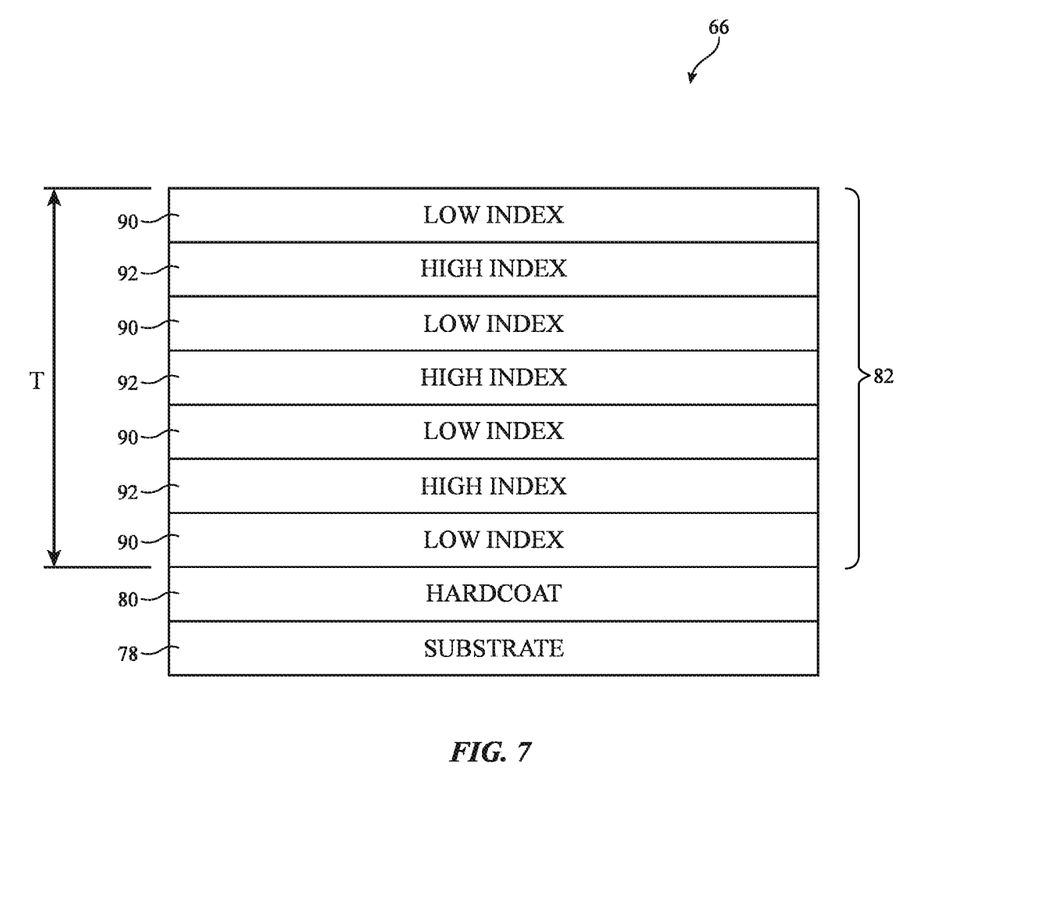
FIG. 7 is a side view of an illustrative supplemental lens having an antireflection coating formed from thin film layers in accordance with some embodiments.

As shown in FIG. 7, supplemental lens 66 antireflection coating 82 on hard coat layer 80 and substrate 78. Substrate 78 and hard coat layer 80 may correspond to the same layers discussed in connection with FIG. 5.

Antireflection coating 82 may be formed from thin film layers 90 and 92. Thin film layers 90 may have low refractive indexes, while thin film layers 92 may have high refractive indexes. Together, thin film layers 90 and 92 may constructively interfere with visible and near infrared light to reduce the reflectance of supplemental lens 66 at these wavelengths.

Low index thin film layers 90 may be formed from silicon dioxide (SiO$_2$), magnesium fluoride (MgF$_2$), calcium fluoride (CaF$_2$), or other material with a low index of refraction. High index thin film layers 92 may be formed from zirconium dioxide (ZiO$_2$), titanium dioxide (TiO$_2$), niobium oxide (NbO), or other material with a high index of refraction.

Antireflection coating 82 may have thickness T. In some embodiments, it may be desirable for antireflection coating 82 to have a thickness that is large enough to sufficiently reduce reflections in visible and near infrared wavelengths, while remaining small enough to maintain the other properties of supplemental lens 66 (e.g., the prescription of the lens). Therefore, antireflection coating 82 may have a thickness T of less than 500 nm, of less than 545 nm, of between 350 nm and 550 nm, of approximately 530 nm, of between 500 nm and 600 nm, or other suitable thickness. Moreover, antireflection coating 82 may have ten or less of total thin film layers 90 and 92, 7 total thin film layers 90 and 92, between 6 and 8 total thin film layers 90 and 92, or other suitable number of total thin-film layers 90 and 92. Low-index thin film layers 90 (e.g., silicon dioxide layers) may have thicknesses of less than 205 nm, and the high-index thin film layers 92 (e.g., zirconium dioxide layers) may have thicknesses of less than 130 nm, as examples. In this way, antireflection coating 82 may reduce reflectance in visible and near infrared wavelengths, while remaining thin enough to maintain the properties of supplemental lens 66.

An illustrative embodiment an antireflection coating formed from a stack of thin film layers is as follows:

| Layer # | Layer Material | Layer Thickness (nm) |
|---|---|---|
| 1 | SiO2 | 205 |
| 2 | ZrO2 | 22 |
| 3 | SiO2 | 30 |
| 4 | ZrO2 | 129 |
| 5 | SiO2 | 15 |
| 6 | ZrO2 | 26 |
| 7 | SiO2 | 103 |
|   | Total Thickness | 530 |

In this illustrative embodiment, layer 1 may be formed on hard coat 80 (or directly on substrate 78 if hard coat 80 is omitted), and layer 7 may be an upper layer of antireflection coating 82.

This embodiment is merely illustrative. In general, antireflection coating 82 may include any suitable number of thin film layers, the thin film layers may be formed from any suitable low and high index materials, and the thin film layers may have modified thicknesses to reduce the reflectance of supplemental lens 66 in the visible and near infrared wavelengths.

As an alternative to forming antireflection coating 82 using thin film layers, antireflection coating 82 may be formed as a moth-eye antireflection coating. An illustrative example of a supplemental lens with a moth-eye antireflection coating is shown in FIG. 8.

Figure 8:
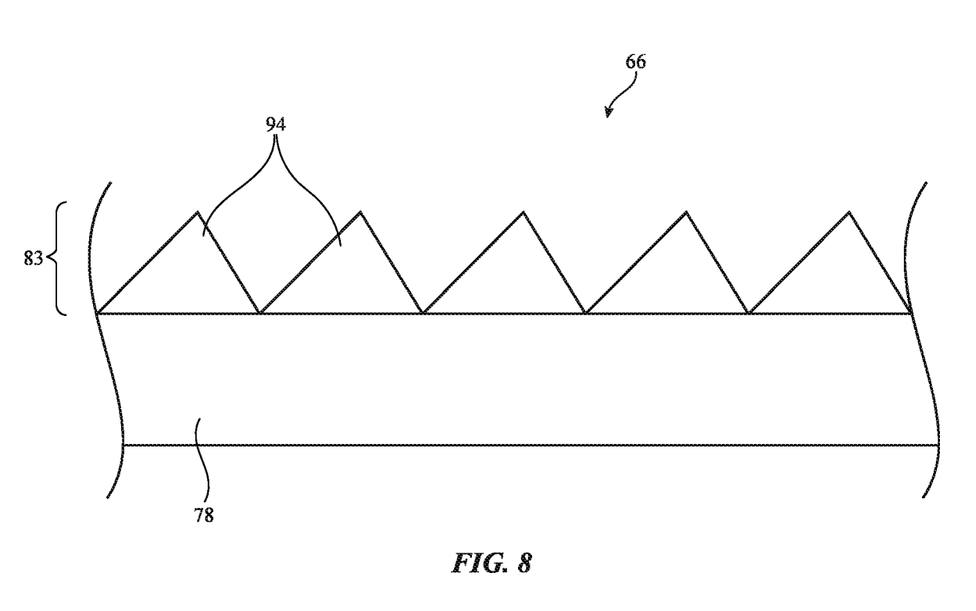
FIG. 8 is a side view of an illustrative supplemental lens having an antireflection coating formed from a moth-eye coating in accordance with some embodiments.

As shown in FIG. 8, supplemental lens 66 may include moth-eye antireflection coating 83 on substrate 78. Although not shown in FIG. 8, a hard coat, such as hard coat 80, may be incorporated between substrate 78 and moth-eye antireflection coating 83, if desired.

Antireflection coating 83 may include textured features 94 on substrate 78. Textured features 94 may, for example, be nanostructures formed on the surface of substrate 78. Textured features 94 may create a refractive index gradient between substrate 78 and the external air (e.g., by gradually getting wider between the air interface and the interface with substrate 78), thereby reducing the reflectance of supplemental lens 66 across both visible and near infrared wavelengths.

Antireflection coating 83 may be formed from polycarbonate, glass, polymer, or other suitable material. In some illustrative embodiments, antireflection coating 83 and substrate 78 may both be formed from polycarbonate to ensure that the refractive index of textured features 94 and substrate 78 match at the interface between the two materials. However, this is merely illustrative. In general, antireflection coating 83 and substrate 78 may both be formed from any suitable material.

Although textured features 94 are shown as having pyramidal shapes, this is merely illustrative. Textured features 94 may be formed from protrusions of any suitable shape(s), such as bumps or cones.

Figure 9:
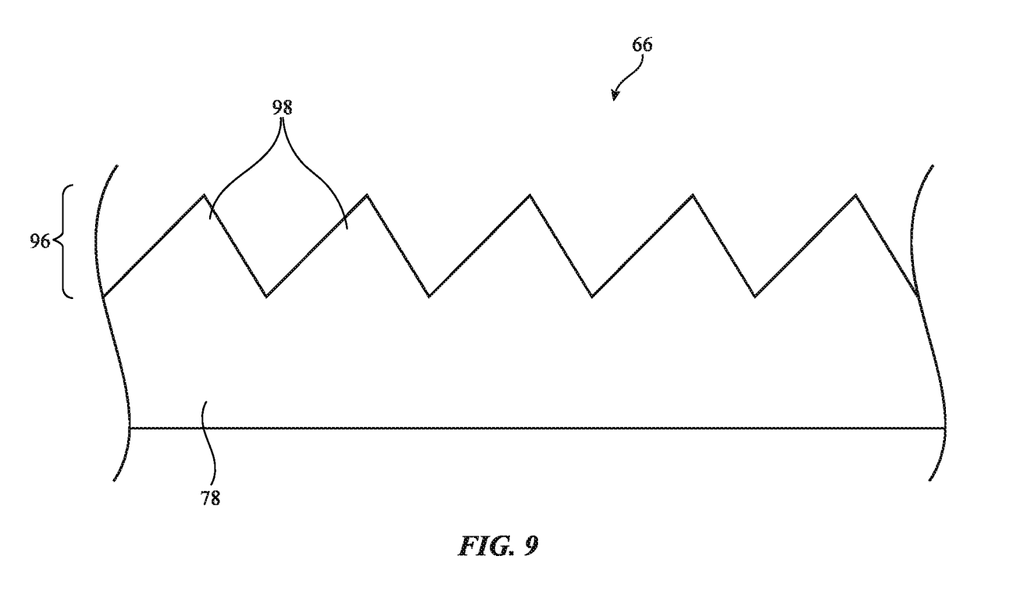
FIG. 9 is a side view of an illustrative supplemental lens having an antireflection portion formed from integral moth-eye textured features in accordance with some embodiments.

Instead of having a moth-eye antireflection coating applied to a surface of substrate 78, supplemental lens may have an integral moth-eye antireflection portion. An illustrative example of this arrangement is shown in FIG. 9. In particular, textured features 98 may form antireflection portion 96 on a surface of substrate 78. For example, the surface of substrate 78 may be textured (e.g., by embossing, cutting, blasting, ablating, or other texturing), forming textured features 98. Textured features 98 may create a refractive index gradient between substrate 78 and the external air (e.g., by gradually getting wider between the air interface and the interface with substrate 78, thereby reducing the reflectance of supplemental lens 66 across both visible and near infrared wavelengths. In this way, an integral antireflection portion may be formed on substrate 78.

Although FIG. 9 shows antireflection portion 96 formed from a textured portion of substrate 78, antireflection portion 96 may be formed from a textured portion of an intervening hard coat, if desired.

As described above, one aspect of the present technology is the gathering and use of information such as information from input-output devices. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Computer-generated reality: in contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands). A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects. Examples of CGR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground. Examples of mixed realities include augmented reality and augmented virtuality. Augmented reality: an augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof. Augmented virtuality: an augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Hardware: there are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, pLEDs, liquid crystal on silicon, laser scanning light sources, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

The foregoing is merely illustrative and various modifications can be made to the described embodiments. The foregoing embodiments may be implemented individually or in any combination.

What is claimed is:

1. A lens, comprising:
    a substrate;
    a hard coat on the substrate; and
    an antireflection portion on the hard coat, wherein the lens has a reflectance of less than 2.5% across visible wavelengths and near infrared wavelengths at on-axis viewing angles; and
    wherein the lens has a reflectance of less than 3.5% across visible and near infrared wavelengths at viewing angles between 0° and 45° from a surface normal of the antireflection portion.

2. The lens of claim 1, wherein the lens has a reflectance of less than 8% across near infrared wavelengths at viewing angles between 0° and 60° from the surface normal.

3. The lens of claim 2, wherein the lens has a reflectance of less than 30% at viewing angles of 75° from the surface normal.

4. The lens of claim 1, wherein the lens has a haze of less than 0.5%.

5. The lens of claim 1, wherein the lens transmits at least 95% of light between wavelengths of 425 nm and 700 nm.

6. The lens of claim 1, wherein the antireflection portion comprises an antireflection coating with a plurality of thin film interference layers with alternating refractive indexes.

7. The lens of claim 1, wherein the antireflection portion comprises a moth-eye antireflection coating on the hard coat.

8. The lens of claim 1, wherein the antireflection portion comprises an integral moth-eye antireflection portion comprising a textured surface of the hard coat or the substrate.

9. A lens configured to transmit visible light and a given near infrared wavelength of light emitted by a gaze tracking system, the lens comprising:
    a substrate;
    a hard coat on the substrate; and
    an antireflection coating on the hard coat, wherein the antireflection coating comprises a plurality of first thin film layers with a first refractive index and a plurality of second thin film layers with a second refractive index that is higher than the first refractive index, wherein the first and second thin film layers alternate within the antireflection coating, and wherein the substrate, the hard coat, and the antireflection coating together reflect less than 3.5% of light across visible wavelengths at viewing angles between 0° and 45° from a surface normal of the antireflection coating and reflect less than 1% of light at the given near infrared wavelength.

10. The lens of claim 9, wherein the first thin film layers comprise silicon dioxide layers and the second thin film layers comprise zirconium dioxide layers.

11. The lens of claim 10, wherein the thickness of the antireflection coating is less than 550 nm.

12. The lens of claim 11, wherein the antireflection coating comprises ten thin film layers or less between the pluralities of first and second thin film layers.

13. The lens of claim 9, wherein the substrate, the hard coat, and the antireflection coating together have an average reflectance of less than 2.5% across visible and near infrared wavelengths.

* * * * *